United States Patent Office 3,682,665
Patented Aug. 8, 1972

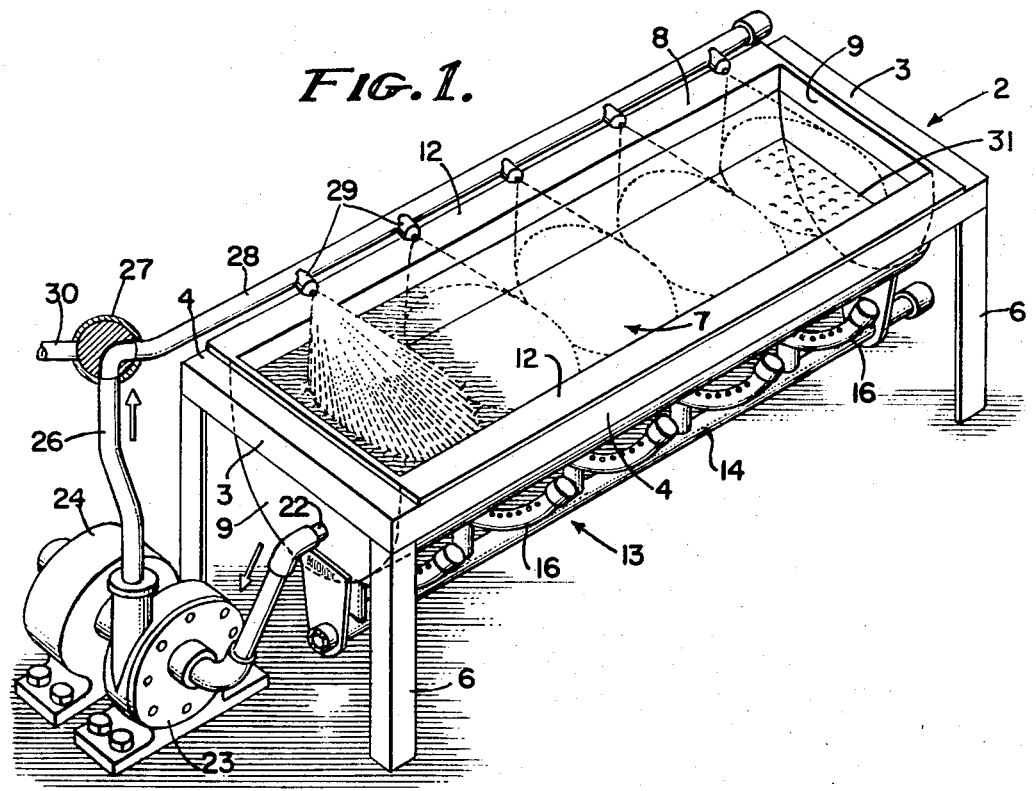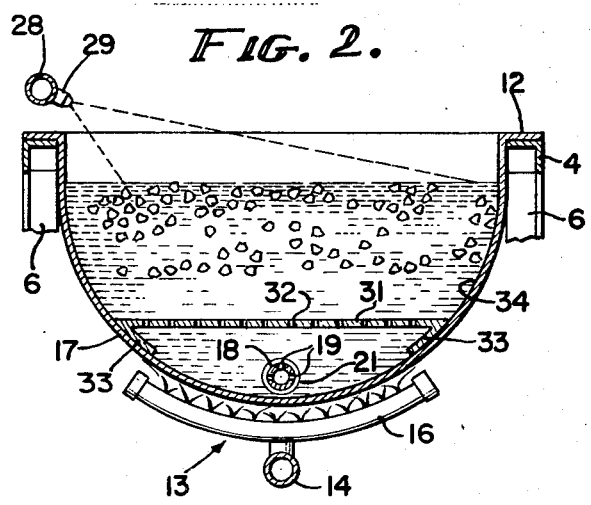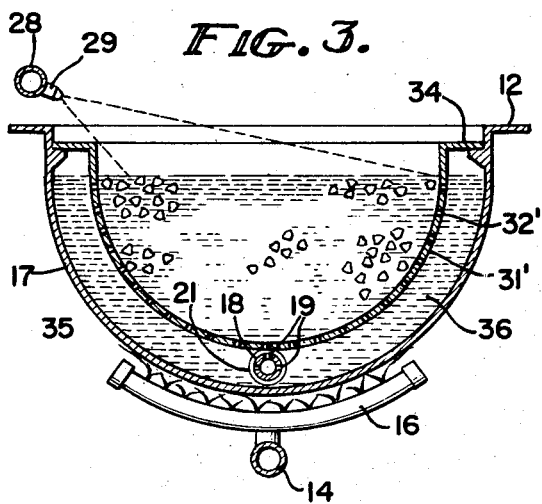

3,682,665
COOKING APPARATUS FOR GRAINS AND THE LIKE
Inocente A. Diaz, 287 San Jose Ave., San Jose, Calif. 95125
Filed Nov. 26, 1969, Ser. No. 880,179
Int. Cl. A47j 37/12
U.S. Cl. 99—409                           1 Claim

ABSTRACT OF THE DISCLOSURE

Presented is a cooking apparatus including a vat within which a quantity of a food product to be cooked may be immersed, with provision being made for recirculating the cooking medium in a manner to agitate the food product as it is being cooked while effectively dispersing throughout the body of food product being cooked any type of additive such as lye, for instance, that might be added to the cooking medium. Additionally, baffle means are provided in the vat to retain the food product away from the hot sides of the vat to prevent burning or scorching of the food product being cooked.

BACKGROUND OF INVENTION

Food products such as grains are difficult to cook because when placed in a cooking utensil in the presence of a fluid they soak up the fluid, expand, and form a mass that is difficult to stir or agitate. Such a disability frequently results from the nature of the food product and the undesirability of agitating the food product to the point of modifying the granular characteristics of the food product. Frequently, it is undesirable to insert paddles or other types of devices to effect stirring or agitation because of the danger of contaminating the food product. Accordingly, it is one of the objects of the invention to provide a cooking apparatus in which a food product such as one of the grains may be completely immersed in a fluid cooking medium and effectively stirred and agitated through recirculation of the fluid itself.

The cooking of food products in the form of grains offers another problem in the form of burning or scorching of the food product if it comes in direct contact with a metallic surface heated to the degree necessary for efficient heat transfer to a fluid medium to effect cooking of the product. Such physical contact of the food product with the hot sides of the vat results in burning or scorching of the outer layer of the food product with resultant sticking thereof to the inside surface of the vat. This is disadvantageous for two reasons: first, it flavors the entire body of food product being cooked, and second, prevents the efficient transfer of heat because it forms an insulating layer against the inside surface of the vat, thus precluding uniform distribution of the heat therethrough.

Food products such as grains are frequently cooked in a medium containing one or more additives. For instance, in the cooking of corn, lye in appropriate quantities is added to the cooking medium. It has been found that unless efficient agitation and stirring of the body of corn is effected, the lye remains lumped within the body of food product instead of being dispersed uniformly throughout the fluid cooking medium. Accordingly, it is another object of the invention to provide in a cooking apparatus for corn a recirculating system which simultaneously agitates the body of corn kernels and recirculates the fluid medium so as to uniformly distribute throughout the body of food product being cooked any additives that might be added to such cooking medium.

BRIEF SUMMARY OF INVENTION

In terms of broad inclusion, the cooking apparatus of the invention comprises an elongated vat, preferably having a semi-cylindrical cross-section, below which is disposed an appropriate heating element, conveniently in the form of a gas burner. Within the vat, extending longitudinally along the bottom thereof, is an elongated conduit having apertures spaced therealong through which a fluid medium may be sucked and recirculated through appropriate pump means to a second conduit outside the vat and extending longitudinally thereover so as to discharge such fluid medium under pressure onto the surface of the food product or fluid medium within which it is being cooked.

Disposed within the vat is a baffle which may conveniently take the form of a flat plate proportioned to extend between opposite sides of the vat to divide the vat into a cooking section and a fluid medium heating section. In another aspect of the invention, the baffle may take the form of a semi-cylindrical plate concentrically disposed within the vat so as to provide a space between the baffle and the inside surface of the vat.

DESCRIPTION OF DRAWINGS

FIG. 1 is a perspective view illustrating the cooking apparatus of the invention.
FIG. 2 is a vertical cross-sectional view taken in the plane indicated by the line 2—2 in FIG. 1.
FIG. 3 is a vertical cross-sectional view illustrating a cooking apparatus embodying a different type baffle therewithin.

DESCRIPTION OF PREFERRED EMBODIMENT

Referring to FIG. 1, the cooking apparatus of the invention comprises a frame designated generally by the numeral 2, having end and side rail members 3 and 4, respectively, supported in an elevated position by appropriate leg members 6. Appropriately sized angle iron may conveniently be used to make up the frame.

Disposed within the frame and supported thereby is a vat designated generally by the numeral 7, and including semi-cylindrical side walls 8 and end walls 9. The vat may be fabricated from stainless steel, or any other material, such as cast iron, which will withstand a high degree of heat. The vat so formed is provided with radially outwardly extending flanges 12 along its long edges, the flanges overlapping the supporting frame, so that the semi-cylindrical vat lies suspended in such frame.

Disposed beneath the vat is a burner, conveniently gas, designated generally by the numeral 13, and including an elongated conduit 14 which functions as a manifold to convey an appropriate gas, such as natural gas, from a source thereof, and distribute it uniformly through a multiplicity of lateral burner elements 16 as shown. The laterally extending burner elements are preferably spaced longitudinally along the manifold, and are curved as shown best in FIGS. 2 and 3 to extend part way around the semi-cylindrical exterior surface 17 of the vat. The burner may be supported independently beneath the vat by appropriate pedestals (not shown) extending therebelow, or it may be suspended by appropriate strap means attached directly to the vat or frame.

Disposed within the vat and extending longitudinally therealong adjacent its bottom, is an elongated conduit 18 having sets of circumferentially spaced apertures 19 therein spaced longitudinally therealong. At its free end within the vat, the conduit 18 is provided with an appropriate cap 21 so that when suction is applied to the conduit, fluid from within the vat will flow into the apertures 19.

At its end 22 outside the vat, the conduit is connected by appropriate conduit through a pump 23 driven by a motor 24 so as to draw fluid through the apertures 19 in conduit 18, through the pump and an outlet extension 26 connected thereto, which in turn is connected through an appropriate gate valve 27 to an elongated conduit 28 extending longitudinally along one edge of the vat. Jet outlets 29 are spaced therealong and disposed so as to spray fluid under pressure over the surface of the fluid medium and food product within the vat. Extending from the gate valve is a conduit 30 which may be used to transfer hot fluid from one vat to an adjacent vat upon completion of the cooking cycle.

It will thus be seen that operation of the pump effectively takes hot fluid medium from within the vat at a point where such fluid medium is at its highest temperature and recirculates it into the body of food products being cooked in a manner which will effect uniform distribution of the heated fluid medium throughout the body of food product, and which additionally, will effect agitation of such food product within the vat.

While it is believed that such recirculation means of the fluid medium will effect efficient cooking of the food product and will to a large extent eliminate scorching and burning of the food product because of such agitation, experience has shown that it is advantageous to prevent the food product within the vat from coming in direct contact with the hot interior surface of the vat.

Accordingly, referring to FIG. 2, there is disposed within the vat a baffle 31 in the form of an elongated plate having a multiplicity of apertures 32 therein, and provided along opposite long edges with in-turned flanges 33 adapted to engage the interior surface 34 of the vat. The width of the baffle is proportioned so that the long edges thereof engage the inside surface of the vat along a zone which lies above the surface of the vat that is directly heated by the flame from the gas burner. In this manner, the food product contained within the cooking section defined within the vat above the baffle does not come in contact with the hot interior surface of the vat, and scorching and burning is thus precluded.

It will be seen however that because of the apertures 32 in the baffle, while the food product is retained within the cooking section of the vat, the fluid medium within which the food product is being cooked is free to circulate through the apertures into the fluid medium heating section defined between the baffle and the bottom of the vat. It is from this fluid medium heating section that the fluid medium is sucked into the conduit 18 for recirculation and discharge into the body of food product from conduit 28.

In the embodiment of the apparatus illustrated in FIG. 3, the baffle 31' has been modified in its configuration but not in its function. In this embodiment, the baffle is formed from an elongated plate into a semi-cylindrical configuration conforming generally to the configuration of the vat, and is provided along opposite long edges with retaining flanges 34 which retain the baffle concentrically spaced from the inside surface 35 of the vat. In this manner, it will be seen that an annular space 36 is provided from which food product is excluded by the baffle, but through which hot fluid medium may flow through the apertures 32' in the baffle. In a manner similar to the arrangement illustrated in FIG. 2, operation of the pump 23 sucks hot fluid medium from the annular chamber 36 and discharges it through conduit 28 disposed above the vat and provided with jet sprays 29 which direct the fluid medium under pressure onto the surface of the food product being cooked.

It will of course be obvious that elaborations may be appended to the structure thus described. Thus, appropriate heat and pressure sensing devices could be installed to control the temperature and pressure in the recirculating system, and appropriate means in the form of sheet metal shields could be disposed about the burners illustrated in FIGS. 2 and 3 to contain the flame discharged therefrom and to channel the products of combustion into an appropriate flue. These appendages, while desirable, do not modify the advantages flowing from the use of a recirculating system and baffle construction as described. Accordingly, they have been omitted for purposes of brevity in this description.

Having thus described my invention, what is claimed to be novel and sought to be protected by Letters Patent is as follows:

1. In an apparatus for applying heat indirectly to a food product susceptible to spoilage through burning or scorching upon application of direct heat thereto, the combination consisting of:
   (a) an elongated vat formed of a single wall adapted to receive in its interior predetermined quantities of a liquid and food product to be cooked,
   (b) apertured baffle means mounted in said vat in spaced relation to the inside surface of the wall of the vat for supporting thereon the food product in spaced relation to the inside surface of the single wall forming the vat,
   (c) heat supply means disposed adjacent the outside surface of the lower portion of the single wall of the elongated vat throughout its length for supplying heat directly to the single wall of the vat,
   (d) a first elongated conduit having apertures therealong disposed within said vat between said apertured baffle and the inside surface of the wall of the vat at a low portion thereof,
   (e) a liquid circulating pump having its suction inlet connected by conduit means to said elongated conduit in the vat,
   (f) means for agitating the contents of said vat, said means comprising an elongated conduit mounted above and along one elongated edge of said vat and having spaced apart jet spray nozzles directed towards the inside of the vat and having conduit means connecting it to the discharge of said pump, whereby the heat supply means heats the liquid which cooks said food product, said circulating pump pumps a portion of said liquid to said spray jet nozzles which discharge the liquid under pressure in jet streams onto said food product and liquid in the vat thereby thoroughly agitating the mixture of liquid and food product to more uniformly cook the food product while avoiding burning and scorching of the same.

References Cited

UNITED STATES PATENTS

| | | |
|---|---|---|
| 1,659,415 | 2/1928 | Thomas. |
| 254,355 | 2/1882 | McCord _____ 99—403 |
| 2,393,420 | 1/1946 | Scheuplein _____ 99—403 |
| 2,643,603 | 6/1953 | Balluteen _____ 99—407 X |
| 2,685,249 | 8/1954 | Badger _____ 99—403 |
| 2,827,379 | 3/1958 | Phelan _____ 99—403 |
| 3,115,084 | 12/1963 | Anetsberger et al. ___ 99—407 X |
| 3,332,338 | 7/1967 | Wein _____ 99—403 X |
| 3,477,361 | 11/1969 | Bradshaw _____ 99—408 |

WALTER A. SCHEEL, Primary Examiner

A. I. CANTOR, Assistant Examiner